United States Patent
Masopust, Jr.

[11] 3,855,527

[45] Dec. 17, 1974

[54] METHOD AND SYSTEM FOR DETERMINING THE RESISTANCE OF THE DIELECTRIC IN A CAPACITOR

[75] Inventor: Otto T. Masopust, Jr., Bolingbrook, Ill.

[73] Assignee: Western Electric Company, Incorporated, New York, N.Y.

[22] Filed: Jan. 7, 1974

[21] Appl. No.: 431,174

[52] U.S. Cl. ............................................... 324/60 C
[51] Int. Cl. .......................................... G01r 27/26
[58] Field of Search ........... 324/60 C, 60 CD, 60 R

[56] References Cited
UNITED STATES PATENTS
3,518,537  6/1970  McFee .............................. 324/60 R

*Primary Examiner*—Stanley T. Krawczewicz
*Attorney, Agent, or Firm*—D. D. Bosben

[57] ABSTRACT

A rapid and accurate indication of the resistance of the dielectric in a capacitor with respect to a minimum acceptable value is obtained by connecting the capacitor in a feedback circuit of a high gain amplifier between an output and an input thereof. Initially, the capacitor is rapidly charged through a variable resistance connected to the input of the amplifier, until the charge on the capacitor is equal to a set value, such as its rated voltage. The variable resistance then is abruptly increased to a predetermined value that will maintain the charge on an acceptable capacitor at the set charge value. The voltage output of the amplifier then is monitored to ascertain stability, further charging or discharging of the capacitor, to provide an indication as to whether the capacitor's dielectric resistance is at, above or below the minimum acceptable value, respectively.

16 Claims, 2 Drawing Figures

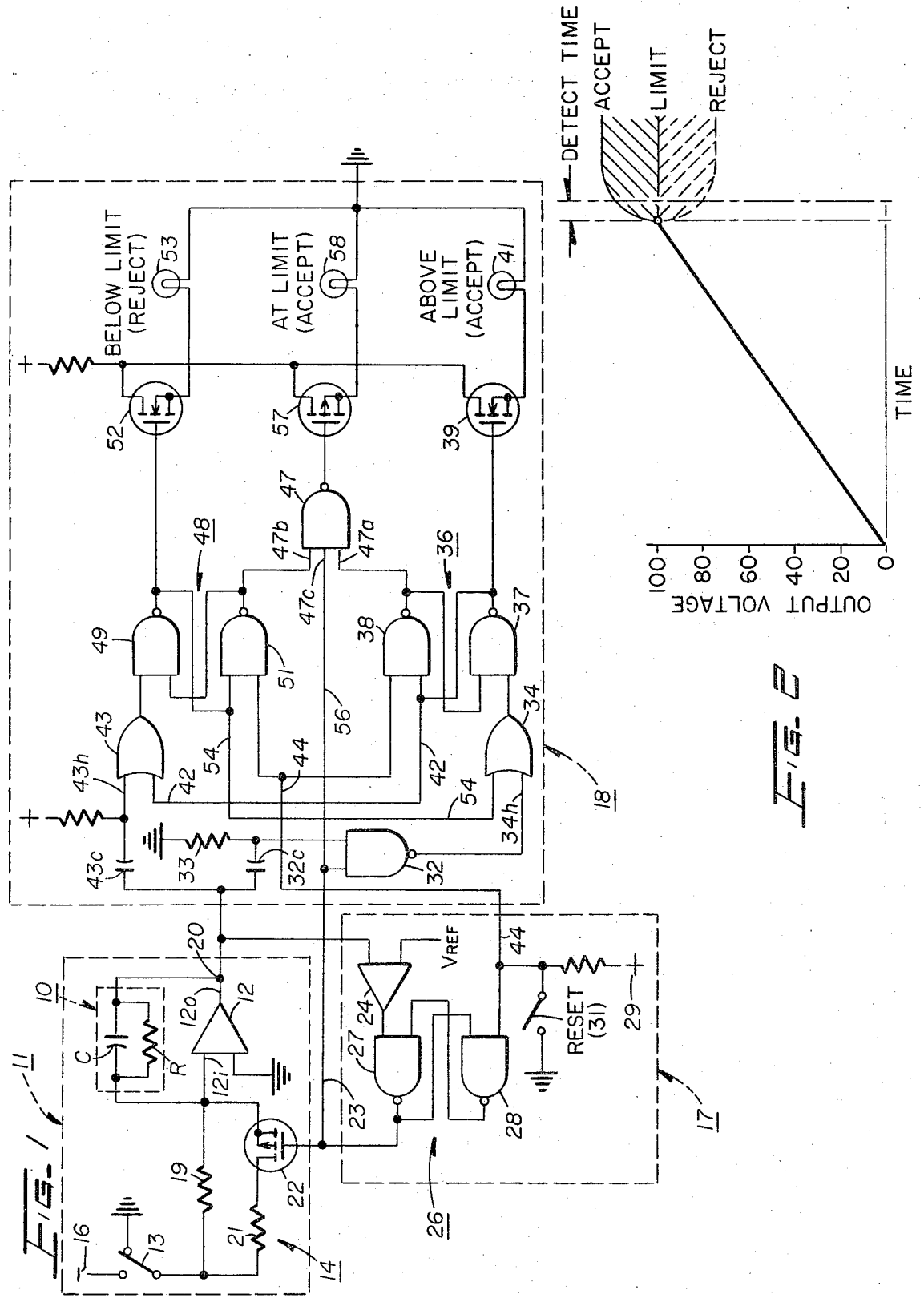

3,855,527

METHOD AND SYSTEM FOR DETERMINING THE RESISTANCE OF THE DIELECTRIC IN A CAPACITOR

BACKGROUND OF THE INVENTION

1. Field of the Invention

This invention relates to a method and system for determining the resistance of the dielectric in a capacitor, and more particularly to a method and system for rapidly and accurately determining whether the resistance of the dielectric in a capacitor is at, above or below a minimum acceptable value.

2. Description of the Prior Art

In the manufacture of capacitors, it is known that the dielectric is not electrically perfect and possesses small conductive paths which allow stored charge to flow between the capacitor electrodes. Since it is essential that the dielectric of each capacitor have a minimum resistance to eliminate an excessive amount of this leakage current through the capacitor when it is installed in an electrical circuit, a measurement of this property is necessary on each capacitor to determine if its dielectric resistance is below the acceptable minimum limit.

In the past, in determining whether the dielectric resistance of a capacitor is below a minimum acceptable value, is has been common practice to charge the capacitor to a known voltage and then monitor leakage current flow through the capacitor during a certain period of time, to ascertain whether the leakage current exceeds an acceptable value. This arrangement is undesirable, however, because of the excessive time involved in both the capacitor charging and leakage current measuring phases of the test operation. Further, since the indication of acceptability is dependent upon the ability of the test circuit to measure the leakage current in what often is a slowly changing condition, the test results tend to be inaccurate, particularly where the acceptable maximum leakage current is of relatively low value.

A similar type system is shown in U.S. Pat. No. 3,268,809, issued Aug. 23, 1966, to R. K. Meyer et al, which discloses a circuit wherein an amplified voltage developed across a resistance in a capacitance charging circuit is bucked against a reference voltage, with the resultant voltage polarity providing an indication of whether the leakage current through the capacitor (and thus the internal resistance of the capacitor) is above or below an acceptable limit. Further, U.S. Pat. No. 3,588,690 discloses a crystal bridge circuit connected in a feedback circuit of an operational amplifier that provides an output go or no-go indication of the value of the crystal resistance. U.S. Pat. No. 3,612,993 also discloses an operational amplifier in which an unknown impedance and a reference impedance are connected in a feedback circuit of the amplifier, and in which the impedances are selectively connected into the feedback circuit to ascertain the unknown impedance, utilizing a variable input resistance and a variable frequency input signal. It also is known to utilize one or more capacitors in a feedback circuit of an operational amplifier in the making of different electrical measurements of various types.

SUMMARY OF THE INVENTION

In accordance with this invention, the resistance of the dielectric in a capacitor with respect to an acceptable value is determined by charging the capacitor through a selectively variable resistance until the capacitor has attained a set charge which is equal to the charge which would be accumulated on an acceptable capacitor if fully charged through a resistance of predetermined value. With the variable resistance set at the predetermined value, whether the capacitor is stable, still charging or discharging then is ascertained to determine whether the resistance of the dielectric is at, above or below the acceptable value, respectively.

More specifically, the resistance of the dielectric in a capacitor with respect to a minimum acceptable value is determined by connecting the capacitor in a feedback circuit of a high gain operational amplifier between an output and an input thereof. The capacitor then is charged through a resistance network, which also is connected to the input of the amplifier, until the capacitor has attained a set charge which is equal to the charge that would be accumulated on an acceptable capacitor if fully charged through a resistance of predetermined value. The resistance network preferably includes a first resistance which multiplied by the gain of the amplifier is equal to the predetermined value, and a second resistance which is connectable in parallel with the first resistance to reduce the effective resistance of the network, thereby providing a low resistance network so that the capacitor is charged at a rapid rate. When the capacitor has attained the set charge, as determined by monitoring the output voltage of the amplifier, the effective resistance of the network is abruptly increased to the predetermined value by disconnecting the second resistance from the charging circuit. The voltage output of the amplifier then is analyzed to determine whether it is stable, positive going, or negative going, and thus whether the resistance of the dielectric in the capacitor is at, above, or below the minimum acceptable value, respectively.

BRIEF DESCRIPTION OF THE DRAWINGS

FIG. 1 is a circuit for determining the resistance of the dielectric in a capacitor with respect to a minimum acceptable value, in accordance with the invention; and FIG. 2 is a graph illustrating, in part, the manner of operation of the circuit shown in FIG. 1.

DETAILED DESCRIPTION

The disclosed embodiment of the invention relates to the measuring of the insulation resistance of the dielectric layers of a capacitor 10 (FIG. 1) with respect to a minimum acceptable value. In this regard, it is contemplated that the invention can be utilized to measure the internal resistance of any type capacitor, e.g., a capacitor formed of metallized dielectric film, alternate discrete layers of electrode and dielectric material, solid electrolyte, etc.

In a measuring operation, the capacitor 10, which is schematically illustrated in FIG. 1 by a capacitance C and a parallel resistance R representing the resistance encountered by the leakage current through the dielectric of the capacitor when the capacitor is in a state, stage, is positioned in a charging circuit 11 by connecting the capacitor in a feedback circuit of a high gain operational amplifier 12 between an output 12o and an input 12i of the amplifier. Upon closure of a test contact 13, the capacitor 10 then is rapidly charged to a set value, such as its rated voltage, through a selectively variable resistance network 14, from a negative D.C. power supply 16. When the charge on the capacitor 10 reaches the set value, as determined by a voltage detector circuit 17, the variable resistance 14 is increased abruptly to a predetermined value which will maintain or hold the set charge on the capacitor 10 if its dielectric resistance R is acceptable. The voltage output of the amplifier 12 then is monitored or analyzed by a logic circuit 18 for stability, further charging or discharging of the capacitor, to determine if the resistance of the capacitor's dielectric is at, above or below the minimum acceptable value, respectively.

The amplifier 12 preferably is of a high voltage operational type, but may be any device whose output response follows the relationship $-E_{in} \times Rf/R_{in} = E_{out}$, where $E_{in}$ is the input voltage, Rf is the feedback resistance, $R_{in}$ is the input resistance, and $E_{out}$ is the output voltage. Thus, with the capacitor 10 connected in the feedback circuit of the amplifier 12 as shown in FIG. 1, for a preselected output voltage $E_{out}$ (which is equal to the charge on the capacitor), a properly selected value of the input resistance $R_{in}$ will maintain the set charge on the capacitor if its dielectric resistance R is exactly equal to a minimum acceptable value.

Since in the illustrated embodiment of the invention the dielectric resistance R of the capacitor 10 is extremely large (e.g., 10,000 megohms), the amplifier 12 is preferably of a high gain type, as noted above, in order to attain high sensitivity, accuracy and reliability in the system. Specifically, the use of a high gain (e.g., 100) in the amplifier 12 enables the input resistance $R_{in}$ and the input voltage $E_{in}$ to be of smaller value and still satisfy the equation $-E_{in} \times Rf/R_{in} = E_{out}$. The smaller input resistance $R_{in}$ is desirable since a small resistor usually is more precise as to value than an extremely large resistor, and its value will remain more constant under load and variable conditions, such as changes in ambient temperature. Similarly, the use of a small input voltage source (e.g., 1 volt) is desirable since a precise value of the voltage source is easier to attain and to control than would be the case with a large power supply (e.g., 100 volts).

In the disclosed embodiment of the invention, the input resistance $R_{in}$ for the amplifier 12 is provided by the variable resistance network 14, which includes a capacitor charge maintaining or holding resistance 19, and a bypass charging resistance 21. The first resistance 19 is selected to be of the above-mentioned predetermined value which will maintain the set charge on the capacitor 10 if its dielectric resistance R is at the minimum acceptable value. Thus, where the rated voltage of the capacitor 10 is high, such as 100 volts, the first resistance 19 in the resistance network 14 also will still have a high value, whereby charging of the capacitor through the resistance would require a long period of time. Thus, the second resistance 21, which preferably is of reduced value relative to the resistance 19, is provided in the resistance network 14 and is connectable in parallel with the first resistance 19 by a resistance setting device in the form of a normally closed electronic switch 22, to reduce the effective resistance presented by the resistance network in the charging circuit 11 for the capacitor 10, thereby increasing the rate at which the capacitor will charge (primarily through resistance 21) from the voltage source 16. The electronic switch 22 may be of any suitable type, such as an insulated-gate field effect MOS transistor which is conductive when a low potential is applied to its gate, and which is rendered nonconductive when a high potential is applied to its gate.

When the voltage output of the amplifier 12 reaches the set charge level (e.g., 100 volts) for the capacitor 10, the voltage detector circuit 17, which is connected to the output 12o of the amplifier, generates a high potential control signal to render the field effect transistor 22 nonconductive, thus dropping the charging resistance 21 out of the capacitor charging circuit 11 and abruptly increasing the effective resistance of the resistance network 14 to the predetermined value represented by the charge maintaining resistance 19. Part of this control signal from the voltage detector circuit 17 also is applied over a lead 23 to the logic circuit 18, which also is electrically connected to the output 12o of the amplifier 12.

If the dielectric resistance R of the capacitor 10 is at a minimum acceptable value, the removal of the charging resistance 21 from the resistance network 14 by the voltage detector circuit 17 creates a stable condition in the capacitor charging circuit 11 in which there is no further charging or discharging of the capacitor, which condition then will be detected and indicated by the logic circuit 18. If the dielectric resistance R of the capacitor 10 is above the minimum acceptable value, and there is an abrupt disconnecting of the charging resistance 21 in the capacitor charging circuit 11, the capacitor 10 will charge briefly at an accelerated rate, as illustrated in FIG. 2. This causes generation of a positive-going voltage spike at the output 12o of the amplifier 12 for a brief time period, as illustrated by the "detect time" in FIG. 2, and this voltage spike is applied to the logic circuit 18 to provide an indication that the capacitor is acceptable. In contrast, if the dielectric of the capacitor 10 is so defective that its resistance R is below the minimum acceptable value, the abrupt disconnecting of the charging resistance 21 from the capacitor charging circuit 11 produces a sharp momentary discharge of the capacitor, as illustrated in FIG. 2, whereby a negative-going voltage spike is produced at the output 12o of the amplifier 12 and applied to the logic circuit 18 to provide an indication that the capacitor 10 is unacceptable.

Considering now an example of the operation of the circuit, assume for purposes of illustration that the voltage supply 16 is at $-1$ volt, the resistance 19 is at a value of 100 megohms, the dielectric resistance R of a good capacitor 10 is determined to be at 10 kilomegohms and the resistance 21 is at some low value, e.g., less than 100 megohms. In this instance the amplification gain of the operational amplifier 12 is at an extremely high value as determined by the ratio of the input resistance (parallel resistors 19 and 21) to the resistance of the amplifier feedback circuit including the capacitor 10 and its dielectric resistance R, which resistance may be considered as being in parallel with the capacitance C. Upon closure of the switch 13 the negative voltage is applied to the input 12i of the operational amplifier 12 resulting in a rapid charging of the capacitor 10 until, under the assumed condition of a dielectric resistance of 10 kilomegohms, the voltage at the junction 20 is at 100 volts, whereupon the switch 22 is instantly opened. The circuit parameters are now of such value that the amplification ceases and the measuring circuit 18 is effective to provide an indication that the capacitor 10 has a limit value of dielectric resistance equal to approximately 10 kilomegohms. More particularly, the circuit 11 stabilizes because with a gain of 100 to 1 and an input voltage of −1 volt, and an output voltage of 100 volts, the circuit parameters are satisfied.

If, however, the dielectric resistance R of the capacitor 10 is greater than 10 kilomegohms, the opening of the switch 22 leaves a circuit configuration wherein the gain of the amplifier 12 is greater than 100 to 1 and as a result the capacitor will continue to charge. Inasmuch as this change in gain is instantaneous and is accompanied by a further rapid charging of the capacitor 10 there will be a concurrent instantaneous positive going transient condition impressed at junction 20. This instantaneous change in gain and the accompanying further increase in voltage at junction 20 in a positive direction is detected by the circuit 18 to provide an indication that the dielectric resistance R of the capacitor 10 is above limit values and thus the capacitor is deemed acceptable.

On the other hand, if the value of the dielectric resistance R is below 10 kilomegohms, then the opening of the switch 22 results in a circuit configuration wherein the gain of the amplifier 12 is less than 100 to 1. In this instance there will be an instantaneous discharge of the capacitor 10 because the junction 20 can no longer be maintained at 100 volts. This instantaneous change results in a transient condition at junction 20 wherein the voltage drops in a negative direction. The rapid instantaneous negative going voltage change at junction 20 is detected by the circuit 18 to provide an indication that the dielectric resistance R is below limit values and as a consequence the capacitor 10 is deemed to be unacceptable.

The voltage detector circuit 17 may be of any suitable type and in the illustrated embodiment of the invention includes a differential amplifier 24 which feeds to an electronic latching relay 26 in the form of two NAND gates 27 and 28. The differential amplifier 24 has a first input connected to the output 12o of the operational amplifier 12 and a second input connected to a reference voltage source equal in value to the set voltage at which the capacitor 10 is to be tested. The output of the differential amplifier 24 is connected to an input of the first gate 27 with the output of this gate connected to the insulated gate of the field effect transistor 22 in the capacitor charging circuit 11, and to a first input of the second gate 28. A reset second input of the gate 28 is connected to a voltage source 29 so that the potential on this input normally is at a high level, and also is connectable to ground by the temporary closure of a reset contact 31, for the purpose of restoring the latching relay 26 to its initial operating condition after a measuring operation has been completed. The output of the gate 28 is applied to a second input of the gate 27 in a well known manner.

During the charging of the capacitor 10 to the set test voltage, the output of the differential amplifier 24 progressively decreases from a high potential value, which is being applied to the first input of the NAND gate 27. At the same time, high potential also is being applied on the second input of the gate 27 from the output of the NAND gate 28, whereby the gate 27 is operating to provide an inverted low potential at its output. As long as this low potential is applied to the field effect transistor 22 in the capacitor charging circuit 11, the transistor conducts to maintain the resistance 21 connected in the capacitor charging circuit 11. Since the low output potential of the gate 27 also is being applied to the first input of the gate 28, and since the other input of the gate 28 is tied to the voltage source 29, whereby the output of the gate 28 is at high potential, the latching relay 26 is in a stable conductive condition.

When the charge across the capacitor 10 reaches the set test voltage, however, the output of the differential amplifier 24 changes to a low potential, causing the first NAND gate 27 to change state and to produce a high potential as its output. This high potential is impressed on the gate of the field effect transistor 22 to render it nonconductive, thereby disconnecting the charging resistance 21 from the capacitor charging circuit 11. This high potential also is applied to the first input of the NAND gate 28, whereby both of its inputs then are at high potential and the gate operates to produce an inverted low potential output signal, which is applied back to the second input of the gate 27 to prevent this gate from reverting to its original state. Subsequently, when the measuring operation has been completed, the reset contact 31 is closed temporarily to connect the reset input of the gate 28 to ground, causing this gate to again switch state and produce a high potential at its output, which then is impressed on the second input of the gate 27 to cause this gate to again change state, thus restoring the latching relay 26 to its original condition.

The part of the high potential signal which feeds from the voltage detector circuit 17 over the lead 23 to the logic circuit 18 when the capacitor 10 reaches the set charge value, is applied to a first input of a NAND gate 32 in an above limit portion of the logic circuit. A second input of the gate 32 is electrically connected to the output 12o of the operational amplifier 12 through a coupling capacitor 32c, and is held at a low level as a result of being connected to ground through a resistor 33 until a positive voltage spike from the operational amplifier drives it high. The output of the gate 32, which is normally at a high potential, since at least one of its inputs is initially at a low level, is connected to a first input 34h of an OR gate 34, the output of which is connected to an electronic above limit latching relay 36 of the same type as the latching relay 26 in the voltage detector circuit 17 and including a pair of NAND gates 37 and 38.

More specifically, the output of the OR gate 34 is connected to a first input of the NAND gate 37, the output of which is applied to an electronic switch 39 in an energizing circuit for an indicating lamp 41. The electronic switch 39 may be an insulated-gate field effect transistor similar to the electronic switch 22 in the capacitor charging circuit 11, but which is nonconductive when a low potential is applied thereto from the NAND gate 37, and conductive when a high potential is applied thereto from the gate. The output of the NAND gate 37 also is connected to a first input of the NAND gate 38, and is connected to apply a state-change inhibiting signal over a lead 42 to a normally low potential input of an OR gate 43 in a below limit portion of the logic circuit 18. As with the NAND gate 28 in the voltage detecting circuit 17, a reset input of the NAND gate 38 is connected by a lead 44 to the voltage source 29 and also is connectable to ground upon the temporary closing of the reset contact 31, for the purpose of resetting the latching relay 36 back to an initial test condition following a measuring operation. The output of the NAND gate 38 is connected to a respective second input of the NAND gate 37, and also is connected to a respective first input 47a of an at limit NAND gate 47.

A capacitor 43c couples a normally high potential input 43h of the below limit OR gate 43 to the output 12o of the operational amplifier 12, and the output of this OR gate is applied to a below limit electronic latching relay 48 identical to the above limit latching relay 36 and including first and second NAND gates 49 and 51. More specifically, the output of the OR gate 43 is connected to a first input of the NAND gate 49, which has its output connected to an electronic switch 52 in an energizing circuit for a below limit indicating lamp 53, the electronic switch being identical to the electronic switch 39. The output of the NAND gate 49 is applied to a first input of the NAND gate 51, and is also connected to feed a state-change inhibiting signal over a lead 54 to a normally low potential input of the OR gate 34 in the above limit portion of the logic circuit 18. As in the case of the above limit latching relay 36, a reset input of the NAND gate 51 is connected by the lead 44 to the voltage source 29 and the reset contact 31 in the voltage detector circuit 17. The output of the NAND gate 51 is applied to a respective second input of the NAND gate 49 and to a respective second input 47b of the at limit NAND gate 47.

The at limit NAND gate 47 has a third input 47c which is connected to the output of the voltage detector circuit 17 by a lead 56 and the lead 23. The output of the NAND gate 47 is connected to an electronic switch 57 in an energizing circuit for an at limit indicating lamp 58. The electronic switch 57 may be an insulated-gate field effect transistor which is nonconductive when a high potential is applied thereto from the NAND gate 47, and conductive when a low potential is applied thereto from the gate.

Considering now the operation of the logic circuit 18, at the start of a measuring operation the inputs 34h and 43h of the OR gates 34 and 43 are at a high potential so that the OR gates are conductive and producing high potential output signals, which are applied to their respective inputs of the NAND gates 37 and 49. Since the reset inputs of the NAND gates 38 and 51 both are connected to the voltage source 29 and thus are also at high potential, each of the latching relays 36 and 48 is in the same stable conductive state as the latching relay 26 in the voltage detector circuit 17, with the outputs of the NAND gates 37 and 49 at low potential and the outputs of the NAND gates 38 and 51 at high potential. This also places the leads 42 and 54, connecting the outputs of the NAND gates 37 and 49 to the OR gates 34 and 43, at low potential. Further, the at limit NAND gate 47 has high potential impressed on its two inputs 47a and 47b from the NAND gates 38 and 51, but low potential impressed on its input 47c from the detector circuit 17, whereby it is nonconductive and its output is at high potential. Under these conditions, none of the electronic switches 39, 52 or 57 is conductive, and the indicating lamp 41, 53 and 58 are all de-energized.

After the voltage detector circuit 17 has determined that the capacitor 10 has charged to the set test voltage, causing disconnection of the charging resistance 21 in the capacitor charging circuit 11 and the application of a high potential to the first input of the NAND gate 32 in the logic circuit 18, if the dielectric resistance R is at the minimum acceptable limit the voltage output of the amplifier 12 remains stable and no signal is transmitted into the logic circuit through the coupling capacitors 32c and 43c. Rather, the only significant change in the logic circuit 18 involves the application of a high potential to the input 47c of the at limit NAND gate 47 from the voltage detector circuit 17. Since the other two inputs 47a and 47b of the gate 47 already are at high potential from their respective NAND gates 38 and 51, the gate 47 conducts to produce an inverted low potential at its output. This low potential is applied to the electronic switch 57, rendering it conductive to energize the lamp 58, thus indicating that the capacitor's dielectric is at the minimum acceptable limit. While the time required to make this determination, as indicated by the detect time in FIG. 2, is almost instantaneous, being on the order of less than one microsecond, the light 58 then remains energized until the system is reset by closure of the reset contact 31, as above described.

If the dielectric resistance R of the capacitor 10 is above the minimum acceptable limit, the positive voltage spike generated at the output junction 20 of the operational amplifier 12 as a result of the rapid acceleration in the charge rate of the capacitor 11, is transmitted into the logic circuit 18 through the coupling capacitors 32c and 43c and applied to both the second input of the above limit NAND gate 32 and the normally high potential input 43h of the below limit OR gate 43. Since a high potential already exists on the input 43h of the OR gate 43, however, the positive voltage signal has no effect thereon. In contrast, since high potential now exists on both of the inputs of the NAND gate 32, this gate conducts and its inverted low potential output is applied to the normally high potential input 34h of the above limit OR gate 34, to drive this input to a low potential.

Since both inputs of the OR gate 34 now are at low potential, the gate stops conducting and the resultant low potential at its output is applied to the first input of the NAND gate 37, causing its output to switch to a high potential. This high potential is applied to the electronic switch 39, causing conduction by the switch and energization of the above limit indicating lamp 41. The high potential output of the NAND gate 37 also feeds to the respective input of the NAND gate 38, causing it to conduct and to produce an inverted low potential signal at its output. This low potential is applied to the respective input 47a of the at limit NAND gate 47 to preclude it from conducting, and back to the respective input of the NAND gate 37 to preclude it from reverting to its original state. At the same time, the high potential output of the NAND gate 37 also is impressed over the lead 42 to the below limit OR gate 43 to prevent it from becoming nonconductive as a result of low potential being applied to its normally high potential input 43h as the positive voltage spike decays back to zero.

If the dielectric resistance R of the capacitor 10 is below the minimum acceptable limit, the negative voltage spike produced at the output junction 20 of the operational amplifier 12 as a result of discharge of the capacitor 11 also is transmitted into the logic circuit 18 through the coupling capacitors 32c and 43c. In this instance, the negative voltage signal has no effect upon the above limit NAND gate 32 since the input of the gate to which the signal is applied is already at low potential. Application of the negative voltage spike to the normally high potential input 43h of the below limit OR gate 43, however, drives it to a low value to place both inputs of the OR gate at a low potential. The OR gate 43 then ceases to conduct and the resultant low potential at its output is applied to the associated input of the NAND gate 49. This causes the output of the NAND gate 49 to switch to a high potential, which is applied to the electronic switch 52, causing it to conduct and to energize the below limit indicating lamp 52. The high potential output of the NAND gate 49 also is applied to the associated input of the second NAND gate 51, whereby it conducts to produce an inverted low potential at its output. This low potential is applied to the respective input 47b of the at limit NAND gate 47 to drive it to a low potential and thus prevent this gate from operating, and also is applied back to the respective input of the NAND gate 49 to prevent it from reverting to its original state. The high potential output of the NAND gate 49 also is impressed over the lead 54 to the above limit OR gate 34 to prevent it from becoming nonconductive as a result of its normally high potential input 34h being driven low by energization of the NAND gate 32 when the negative voltage spike returns to zero.

In summary, a method and system of high sensitivity has been provided for rapidly and accurately determining whether the resistance R of the dielectric in a capacitor 10 is at, above or below a minimum acceptable capacitance limit. More specifically, the use of the high gain amplifier 12 enables the capacitor charge maintaining resistance 19 in the network 14 to be established at a small more precise value. Similarly, the voltage source 16 can be made of a smaller more precise value which is more readily controlled as to value in operation, in comparison to the larger power supply which would be required if the high gain amplifier 12 were not utilized. Further the abrupt change in the input resistance network 14 and consequent current flow, upon opening of transistor switch 22, is reflected in either further current flow into the input of the amplifier 12 (resistance value R above rated or desired value) or current flow from the input of the amplifier (resistance value R below rated or desired value). In either case there is a transient change which is amplified and impressed on output junction 20 to provide a discernible signal which is utilized to make a rapid determination as to whether the capacitor resistance R is above or below or at a rated, desired value.

The capacitor charging circuit 11, in which the bypass charging resistance 21 is connectable in parallel with the charge maintaining resistance 19 to reduce the effective resistance of the network 14 in the charging circuit, also provides rapid charging of the capacitor 10 to the set test voltage. In addition, when the capacitor 10 has charged to the set test voltage, as determined by the voltage detector circuit 17, the dropping of the second resistance 21 out of the capacitor charging circuit 11 provides an arrangement in which the resistance in the charging circuit can be readily changed in an abrupt manner to a predetermined value (resistance 19) which will maintain the set charge on the capacitor if it is acceptable. If the insulation resistance R of the capacitor dielectric is exactly at the minimum acceptable limit, the capacitor charging circuit 11 then remains stable and the at limit indicating lamp 58 in the logic circuit 18 is energized by a signal from the voltage detector circuit 17. However, if the insulation resistance R is above or below the acceptable minimum limit, the abrupt change in the effective resistance in the capacitor charging circuit 11 disrupts the stability of the charging circuit to produce a positive or negative voltage spike at the output of the operational amplifier 12, which is of significant magnitude so as to be readily detectable by the logic circuit 18 to energize one of the other of the indicating lamps 41 or 53. Thus, the disclosed system is extremely sensitive and capable of rapidly and accurately determining whether the dielectric resistance R of the capacitor 10 is acceptable.

What is claimed is:

1. The method of determining the dielectric resistance of a capacitor with respect to a limit value, which comprises:

applying charging potential through a selectively variable resistance network to charge the capacitor;

detecting when the capacitor has attained a set charge which is equal to the charge that would be accumulated on a capacitor having dielectric resistance equal to the limit value if fully charged through a resistance of predetermined value;

initially setting the variable resistance network at a low resistance level so that the capacitor is rapidly charged when the charging potential is applied through the variable resistance network;

subsequently increasing the resistance value of the variable resistance network to the predetermined value upon detecting that the capacitor has attained the set charge; and ascertaining whether the capacitor is stable, still charging or discharging, to determine whether the dielectric resistance of the capacitor is at, above or below the limit value, respectively.

2. The method of determining the dielectric resistance of a capacitor with respect to a limit value, as recited in claim 1, in which:

the variable resistance initially is set at a low effective resistance level by connecting a first resistance equal to the predetermined value and a second resistance in parallel; and the effective resistance value of the variable resistance is subsequently increased to the predetermined value by removing the second resistance from the charging network.

3. The method of determining the dielectric resistance of a capacitor with respect to a limit value, as recited in claim 1, wherein the ascertaining step includes:

connecting the capacitor in a feedback circuit of an amplifier between an output and an input of the amplifier; and the charge applying step includes:

applying the charging potential to the input of the amplifier through the variable resistance network to charge the capacitor to subsequently produce an amplifier output indicative of the dielectric resistance upon increasing the resistance of the network.

4. The method of determining the dielectric resistance of a capacitor with respect to a limit value, as recited in claim 3, wherein:

the resistance value of the variable resistance network is abruptly increased to the predetermined value upon detecting that the capacitor has attained the set charge to produce a transient condition at the output of the amplifier which is indicative of a dielectric resistance of the capacitor that is above or below said predetermined value.

5. The method of determining the dielectric resistance of a capacitor with respect to a limit value, as recited in claim 4, wherein:

the abrupt increase in resistance is accompanied by discharging or charging the capacitor, if the dielectric resistance is not at the limit value, to abruptly change the feedback current applied to the input of the amplifier and provide a positive or negative going amplified signal at the output of the amplifier.

6. The method of determining the dielectric resistance of a capacitor with respect to a limit value, as recited in claim 5, which includes:

generating discrete indicating signals upon ascertaining either a positive or negative going amplified signal, and generating another indicating signal upon ascertaining no change in the set charge on the capacitor following the abrupt increase resistance value of the resistance network.

7. A system for determining the dielectric resistance of a capacitor with respect to a limit value, which comprises:

a circuit for charging the capacitor;

a selectively variable resistance in said charging circuit and through which the capacitor is charged;

detecting means for ascertaining when the capacitor has attained a set charge which is equal to the charge that would be accumulated on a capacitor having dielectric resistance equal to the limit value if fully charged through a resistance of predetermined value;

means responsive to said detecting means ascertaining the set charge for setting said variable resistance to the predetermined value; and means operable after said variable resistance has been set to the predetermined value by said setting means, for indicating whether the capacitor is stable, still charging or discharging, to determine whether the dielectric resistance of the capacitor is at, above or below the limit value, respectively.

8. A system for determining the dielectric resistance of a capacitor with respect to a limit value, as recited in claim 7, which further comprises:

second setting means for initially setting said variable resistance at a low resistance level with respect to the predetermined value so that the capacitor is rapidly charged by said charging circuit; and means for generating a negative or positive going signal upon discharging or further charging of the capacitor after said first setting means has set said variable resistance to the predetermined value.

9. A system for determining the dielectric resistance of a capacitor with respect to a limit value, as recited in claim 7, in which:

said variable resistance is in the form of a network which includes a first resistance equal to the predetermined value and a second resistance connectable in parallel through a switch with the first resistance; and said variable resistance setting means includes means responsive to said detecting means ascertaining the set charge on the capacitor for opening the switch to increase the resistance of the network to the predetermined value.

10. A system for determining the dielectric resistance of a capacitor with respect to a limit value, as recited in claim 7, wherein said charging circuit includes:

an amplifier having an input connected to said variable resistance; and a feedback circuit connecting the capacitor between an output and the input of said amplifier for controlling said amplifier to produce negative or positive going signals if the dielectric resistance is below or above the limit value.

11. A system for determining the dielectric resistance of a capacitor with respect to a limit value, as recited in claim 10, which includes:

a first gating circuit responsive to the positive going signal for producing a signal indicative of a dielectric resistance above the limit value; and a second gating circuit responsive to the negative going signal for producing a signal indicative of a dielectric resistance below the limit value.

12. A system for determining the dielectric resistance of a capacitor with respect to a limit value, as recited in claim 11, which includes:

a third gating circuit responsive to said detecting means ascertaining the set charge without the production of a positive or negative going signal for producing a signal indicative of a dielectric resistance at the limit value.

13. A system for determining the dielectric resistance of a capacitor with respect to a limit value, as recited in claim 10, wherein:

said amplifier is an operational amplifier having gain determined by the ratio of the dielectric resistance of the capacitor in the feedback circuit to the resistance value of said variable resistance, said variable resistance being in the form of a network having a first resistor equal to the limit value of the dielectric resistance divided by the gain in said amplifier and a second resistance connected in parallel therewith; and said setting means includes a switch for removing the second resistance from the network to produce a transient positive or negative going pulse at the output of said amplifier if the dielectric resistance is above or below the limit value.

14. A system for determining the dielectric resistance of a capacitor with respect to a limit value, as recited in claim 13, wherein:

said detecting means is connected to the output of said amplifier and is responsive to the charge on the capacitor attaining the set charge for opening said switch to remove the second resistor from said charging circuit so that the gain of said amplifier is sufficient to maintain said charging circuit in a stable state if the dielectric resistance is equal to the value of the first resistor multiplied by the gain of said amplifier.

15. The method of determining the dielectric resistance of a capacitor with respect to a limit value, which comprises:

applying charging potential through a selectively variable resistance network to charge the capacitor;

initially setting the variable resistance network at a low resistance level so that the capacitor is rapidly charged when the charging potential is applied through the variable resistance network;

subsequently increasing the resistance value of the variable resistance network to a predetermined value that will maintain the charge on the capacitor stable if the dielectric resistance of the capacitor is at the limit value; and ascertaining whether the capacitor is stable, still charging or discharging, to determine whether the dielectric resistance of the capacitor is at, above or below the limit value, respectively.

16. A system for determining the dielectric resistance of a capacitor with respect to a limit value, which comprises:

a circuit for charging the capacitor;

a selectively variable resistance in said charging circuit and through which the capacitor is charged;

means for setting the resistance value of the variable resistance to a predetermined value that will maintain the charge on the capacitor stable if the dielectric resistance of the capacitor is at the limit value; and means for ascertaining whether the capacitor is stable, still charging, or discharging, to determine whether the dielectric resistance of the capacitor is at, above or below the limit value, respectively.

* * * * *